(12) United States Patent
Adams, Jr. et al.

(10) Patent No.: US 10,935,106 B2
(45) Date of Patent: Mar. 2, 2021

(54) BLOCK CHAIN WITH MONOLITHIC LINKS

(71) Applicant: SERAPID, INC., Sterling Heights, MI (US)

(72) Inventors: Robert C. Adams, Jr., Armada, MI (US); Steven E. Buell, Sterling Heights, MI (US)

(73) Assignee: SERAPID, INC., Sterling Heights, MI (US)

( * ) Notice: Subject to any disclaimer, the term of this patent is extended or adjusted under 35 U.S.C. 154(b) by 85 days.

(21) Appl. No.: 16/008,287

(22) Filed: Jun. 14, 2018

(65) Prior Publication Data

US 2019/0383357 A1    Dec. 19, 2019

(51) Int. Cl.
*F16G 13/20* (2006.01)
*B66F 3/18* (2006.01)
*F16H 19/06* (2006.01)

(52) U.S. Cl.
CPC ............... *F16G 13/20* (2013.01); *B66F 3/18* (2013.01); *F16H 19/0636* (2013.01)

(58) Field of Classification Search
CPC .... F16G 13/20; B66F 3/06; B66F 3/18; F16H 19/0636; F16H 19/04; F16H 55/26; B25J 18/06; H02G 11/006
USPC .............................................. 74/490; 901/25
See application file for complete search history.

(56) References Cited

U.S. PATENT DOCUMENTS

| 595,508 A | 12/1897 | Wolander |
|---|---|---|
| 1,945,357 A | 1/1934 | Pierce |
| 2,574,657 A | 11/1951 | Pierce |
| 4,179,012 A | 12/1979 | Herberle |
| 6,547,216 B1 | 4/2003 | Bouchard et al. |
| 7,174,702 B2 * | 2/2007 | Ikeda ............... H02G 11/006 59/78.1 |
| 7,175,162 B1 | 2/2007 | Ratcliff |
| 7,222,682 B2 | 5/2007 | Doering et al. |
| 2006/0169081 A1 | 8/2006 | Betson |

(Continued)

FOREIGN PATENT DOCUMENTS

| CZ | 304006 | 8/2013 |
|---|---|---|
| CZ | 304006 B6 | 8/2013 |

(Continued)

OTHER PUBLICATIONS

Spektor, Michael B . . . (2018). Machine Design Elements and Assemblies—5.2.1 Basic Geometric Parameters of Spur Gears. Industrial Press. Retrieved from https://app.knovel.com/hotlink/pdf/id:kt0121SVWA/machine-design-elements/basic-geometric-parameters (Year: 2018).*

*Primary Examiner* — Orlando E Aviles
*Assistant Examiner* — Mahdi H Nejad
(74) *Attorney, Agent, or Firm* — Brooks Kushman P.C.

(57) ABSTRACT

A rigid drive chain comprises a plurality of links connected end-to-end. The links have a block end including a pair of receptacles, a driving face and a driven face. The links have a connector end including a tongue. The block end and connector end are one-piece members that include a plurality of gear teeth along one side of both the block end and connector end. A plurality of protrusions or pins connect the tongues to the receptacles. The links are adapted to be pivoted by a driving gear between a driving orientation of the links with the driving face engaging the driven face of an adjacent link in a forward direction.

8 Claims, 4 Drawing Sheets

(56) References Cited

U.S. PATENT DOCUMENTS

| | | |
|---|---|---|
| 2006/0280587 A1 | 12/2006 | Guerra et al. |
| 2008/0199295 A1 | 8/2008 | Scott et al. |
| 2011/0121141 A1* | 5/2011 | Tatsuta ................. H02G 11/006 248/49 |
| 2011/0126650 A1 | 6/2011 | Sorensen et al. |
| 2011/0212141 A1* | 9/2011 | Wieckhusen ........ A61K 9/0019 424/400 |
| 2011/0240805 A1* | 10/2011 | Komiya ............... G02B 6/4461 248/68.1 |
| 2016/0102748 A1 | 4/2016 | Aoki et al. |
| 2017/0096847 A1 | 4/2017 | Liu et al. |
| 2017/0320218 A1* | 11/2017 | Yoon ........................ B25J 18/02 |

FOREIGN PATENT DOCUMENTS

| | | |
|---|---|---|
| DE | 10103490 | 8/2002 |
| DE | 010103490 A1 * | 8/2002 |
| DE | 10352130 | 5/2004 |
| DE | 10352130 A1 | 5/2004 |
| DE | 102004030676 | 1/2005 |
| DE | 102004030676 A1 | 1/2005 |
| DE | 102012214270 | 2/2013 |
| DE | 102012214270 A1 | 2/2013 |
| DE | 102014007458 * | 7/2017 |
| EP | 0563517 | 10/1993 |
| EP | 0563517 A1 | 10/1993 |
| EP | 0936378 | 8/1999 |
| EP | 0936378 A1 | 8/1999 |
| EP | 1171374 A1 | 1/2002 |
| EP | 1382882 | 1/2004 |
| EP | 1382882 A2 | 1/2004 |
| EP | 1761455 | 3/2007 |
| EP | 1761455 A1 | 3/2007 |
| EP | 2354591 | 8/2011 |
| EP | 2354591 A1 | 8/2011 |
| EP | 2375104 | 10/2011 |
| EP | 2375104 A1 | 10/2011 |
| EP | 3 366 949 * | 10/2015 |
| FR | 2388750 A1 | 11/1978 |
| GB | 240959 | 10/1925 |
| GB | 240959 A | 10/1925 |
| JP | 2012250846 | 12/2012 |
| JP | 2012250846 A | 12/2012 |

* cited by examiner

BLOCK CHAIN WITH MONOLITHIC LINKS

TECHNICAL FIELD

This disclosure relates to a chain made up of monolithic blocks linked end-to-end to push or lift a load in compression and function as a chain in tension.

BACKGROUND

Rigid chains are driven by sprockets or gears that drive the chain and stack the links of the chain. After the links are guided past the driving gear, the chain can be used to push or lift a load. The rigid chain does not require direct guiding under load.

Rigid chains are normally assemblies of links having a plurality of links including laterally aligned, separate link plates that are joined together and are connected to longitudinally adjacent links by rollers. This type of rigid chain requires substantial effort to assemble many parts using special tools and fixtures to hold the parts of the link together as the chain is assembled. Lubrication is also required to be applied to the assembled chain to assure smooth movement of the chain parts.

Rigid chains may be used in a wide variety of applications to move other elements of a system reciprocally. For example, rigid chains are known to be used to raise and lower portions of articulated hospital beds. Rigid chains are generally formed of metallic parts that are conductive and make the chain inappropriate for some applications such as magnetic resonance imaging (MRI) machines and other devices that are used in areas where metallic objects may interfere with electrical fields. Rigid chains are also used in vehicle lifts, convertible auditorium seating systems and a wide range of other applications.

Depending upon the design of a rigid chain, noise and vibration may be created when the rigid chain raises or lowers a load, particularly if the chain is a metallic chain. Metallic chains may also be subject to corrosion and wear of the chain and drive system caused by metal-to-metal contact.

This disclosure is directed to solving the above problems and other problems as summarized below.

SUMMARY

According to one aspect of this disclosure, a rigid chain is disclosed that comprises a plurality of links connected end-to-end. The links have a block end including a pair of receptacles, a pushing face and a pushed face. The links also have a connector end including a tongue. The block end and connector end are monolithic, or one-piece members that include a plurality of gear teeth along one side of both the block end and connector end. A plurality of pins connect the tongues to the receptacles. The links are adapted to be pivoted by a driving gear between a driving orientation of the links with the pushing faces engaging the pushed face of an adjacent link in a forward direction and separating the pushing face from the pushed face of an adjacent link as the links move in a reverse direction.

According to other aspects of this disclosure, in one embodiment, each of the tongues may include a pair of pins that are integrally formed on the tongues and are each received in one of the receptacles. The receptacles may each define a cavity for receiving an end of one of the pins. The receptacles may each include a passageway extending from one side of the block end to one cavity. Each pin may be oblong with a width less than a height of the passageway to fit through the passageway, and the pin may have a length greater than the height of the passageway to prevent dislodging the pin from the cavity except in one orientation.

According to further aspects of this disclosure as it relates to another embodiment, the pins may have a cylindrical outer surface and may be assembled into the receptacles and through a hole defined by the tongues, wherein the block end of one link and the connector end of an adjacent link pivot relative to each other on one of the pins. The rigid chain may further comprise a roller bushing assembled between the pins and the receptacles. The rigid chain may further comprise a pair of retainer rings securing the pins within receptacles.

According to another aspect of this disclosure a rigid chain drive apparatus is disclosed that comprises a plurality of unitary, one-piece links. Each link includes a block end including a pair of side plates spaced apart to define a slot, a pushing face and a pushed face on opposite ends, and a receptacle. Each link also includes a connector end including a tongue extending from the pushing face of the block end and into the slot. At least one pin extends outwardly from the opposite sides of the tongue, wherein the pin is inserted into both receptacles, and a plurality of gear teeth is provided on a side of the side plates and the tongue. A driving gear sequentially engages the gear teeth on the side of the side plates and the tongue of adjacent links to move the links with the pushing faces stacking against the pushed faces in a first direction and unstacking the pushed faces from the pushing faces in a second direction.

According to other aspects of the rigid chain drive apparatus, according to one embodiment, the driving gear may be a pinion gear. The pinion gear may include herringbone teeth and the gear teeth on the side of the side plates and tongue may also be herringbone teeth. The driving gear may be a worm gear having a plurality of helical gear teeth. The tongues may include a pair of pins that are integrally formed on the tongues that are received in the receptacles. The receptacles may define a cavity for receiving an end of one of the pins. The receptacles may include a passageway extending from one side of the block end to the cavity. The pins may be oblong with a width less than a height of the passageway to fit through the passageway, and the pin may have a length greater than the height of the passageway.

According to further aspects of this disclosure according to another embodiment of the rigid chain drive apparatus, the pins may have a cylindrical outer surface and may be assembled into the receptacles and through a hole defined by the tongues. The block end of one link and the connector end of an adjacent link are adapted to pivot relative to each other on one of the pins. The rigid chain drive apparatus may further comprise a roller bushing assembled between the pins and the receptacles, and a pair of retainer rings securing the pins within receptacles.

According to another aspect of this disclosure, a method is disclosed for making a rigid chain. The method includes providing a plurality of links having a block end including a pair of receptacles, and a connector end including a tongue. The block end and connector end are formed in one-piece and include a plurality of gear teeth along one side. The tongue is connected to the block end of an adjacent link by inserting a pin into each of the receptacles of the adjacent link.

According to other aspects of this disclosure as it relates to the method, the step of providing the plurality of links may be performed by injection molding, compression molding, or other manufacturing methods that produce a net shape part. Alternatively, the step of providing the plurality of links may be performed by additive manufacturing methods (3D printing) the links wherein a plurality of additively deposited layers of material are bonded together to form the links.

The pin may have a cylindrical outer surface that is inserted into the pair of receptacles and through an opening defined by the tongue. The pin may include a pair of oblong projections extending from opposite sides of the tongue and may further comprise inserting each of the oblong projections into one of the receptacles of an adjacent link. The receptacles may each define a cavity and a passageway extending from an outer surface of the block end to the cavity and the step of connecting the tongue to the block may further comprise inserting the oblong projections through the passageways and into the cavity.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts. The different embodiments and elements thereof may be combined with other embodiments to provide different drive chains and drive chain apparatus combinations.

Figure 1:
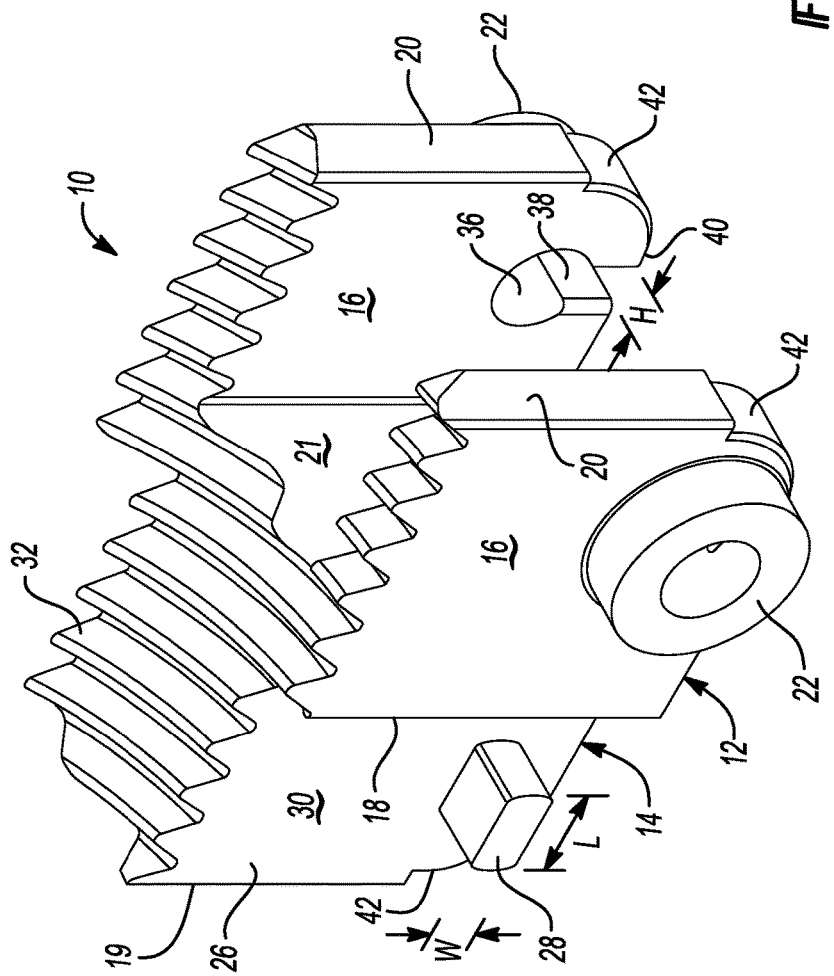
FIG. 1 is a perspective view of a drive chain link made in accordance with one embodiment of this disclosure.

Referring to FIG. 1, a drive chain link 10 is illustrated that includes a block end 12 and a connecting end 14. The block end 12 includes two spaced apart plate portions 16. The plate portions 16 have a driving face 18 and a driven face 20 on opposite fore-and-aft sides of the block end 12. A central driving face 19 and a central driven face 21 are provided on the end of the connecting end 14 and between the plate portions 16. Fore-and-aft as referred to herein refer to the direction the drive chain is moved to be stacked (e.g. vertically) in compression as the fore direction and the direction the drive chain is moved to be retracted in tension as the aft direction.

The plate portions 16 includes receptacles between which a tongue 26 is received with pins 28, or protrusions, being assembled into the receptacles 22. The pins 28 as illustrated are oblong in shape and have a width "W" that is less than the length "L." The pins 28 extend from opposite sides 30 of the tongue 26.

A plurality of gear teeth 32 are provided on one side of the drive chain link 10 and spans the block end 12 and the connecting end 14.

The drive chain link 10 is a monolithic, or unitary one-piece member, that is either injection molded or formed by a 3D printing process wherein layers of additively deposited material is bonded together. The drive chain link 10 is formed of a polyacrylamide resin reinforced with carbon-fiber and/or glass fiber. Other materials may include, for example, polyphthalamide resin reinforced with glass-fiber; heat stabilized polyphthalamide resin with wear and friction reducing additives; PTFE reinforced with woven glass fiber and a thermoset ester binder; or powdered metal materials and processes. The material is selected to obtain substantial compressive strength to avoid distortion, lubricity and low friction to provide durability.

The receptacles 22 define a cavity 36 within which the protrusions 28 are received when the chain is assembled. The protrusions 28 are inserted through a passageway 38 that extends from a lateral side 40 on the link 10. References to the lateral direction as used herein refer to the side of the drive chain link 10 when stacked vertically. The passageway has a height dimension "H" that is sized to accept the width "W" of the protrusion 28 as the protrusion slides through the passageway 38. The cavity 36 received the protrusion 28 lengthwise with clearance to allow the protrusion 28 to pivot inside the cavity 36.

The drive chain link 10 includes rounded corners 42 that provide relief between adjacent links 10 as the links are stacked and unstacked.

Figure 2:
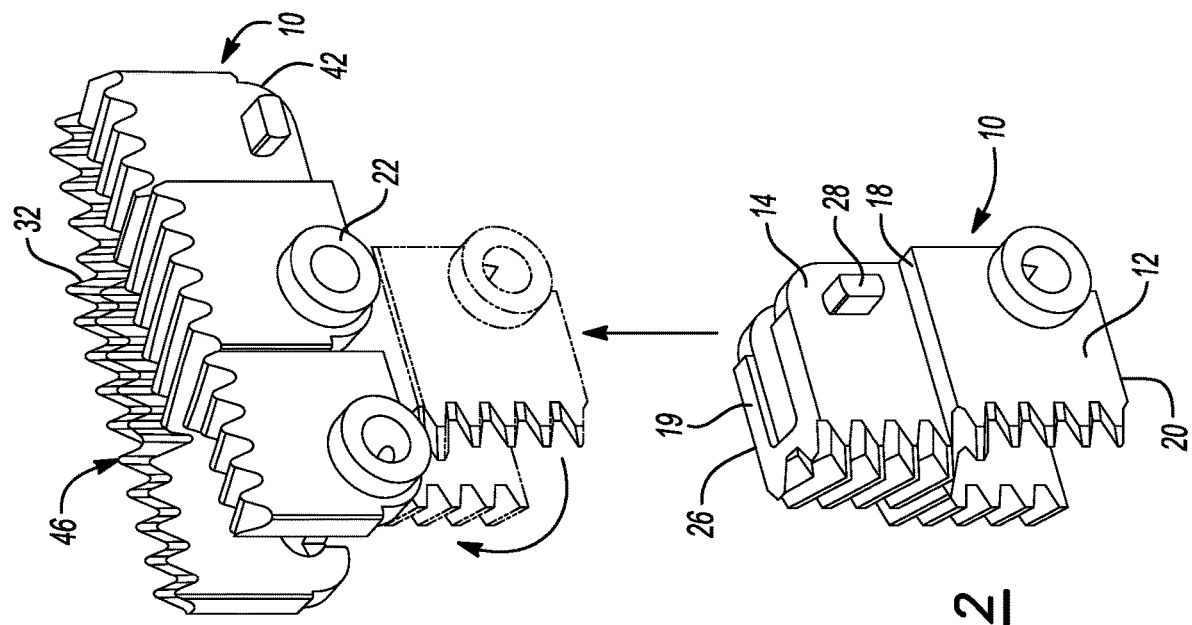
FIG. 2 is a perspective view of another embodiment of a pair of drive chain links being assembled together.

Referring to FIG. 2, assembly of two links together is illustrated the lower link in FIG. 2 is shown in phantom with a vertical arrow showing the direction the link 10 is moved to insert the pin 28 into the receptacle 22 through the passageway 38 and into the cavity 36. After the pin 28 is fully inserted into the cavity 36 the link 10 is pivoted (as shown by the arcuate arrow on the left side of FIG. 2) within the cavity 36 to lock the two adjacent links together. The links are locked together at any angle other than the perpendicular angle required for assembling the links together.

When the links 10 are stacked, the driving face 18 is in contact with a driven face 20 of the adjacent link 10 and functions to push the driven link 10. The central driving face 19 contacts the central driven face 21 that create a full width load path across the link in combination with the driving face 18 and the driven face 20. The connecting end 14 includes a center block that is between the central driving face 19 and the central driven face 21. The block end 12 includes two spaced apart plate portions 16 bounded by the driving face 18 and the driven face 20. The length of the block portion is equal to the length of the plates 16. When the chain is straight, or stacked in compression, the load is supported on a stack of the inside blocks and also on the two stacks of the plate portions 16. By stacking the inside blocks and the two plate portions, the load capacity of the chain is increased.

Figure 3:
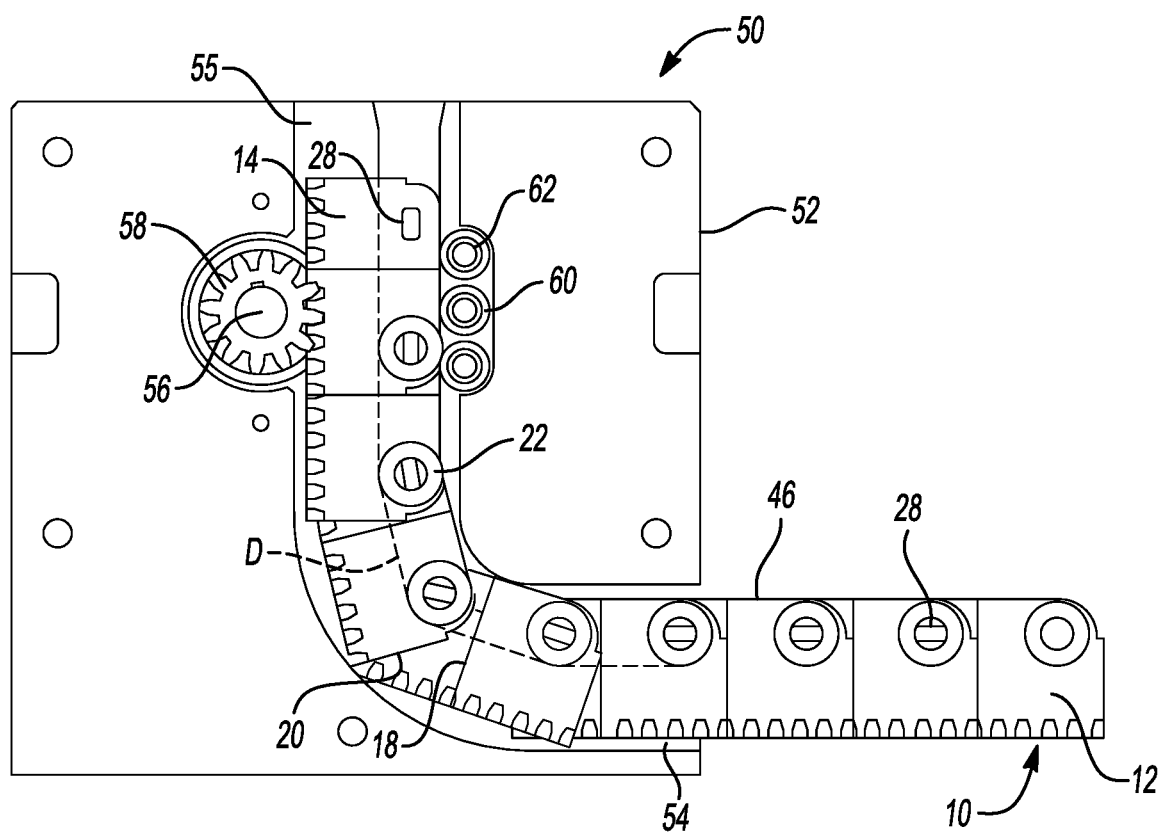
FIG. 3 is an elevation view of a rigid drive chain apparatus made in accordance with one embodiment of this disclosure.

The gear teeth of the adjacent links 10 are aligned to be driven by a drive gear shown in FIG. 3. The gear teeth extend across the entire side of the links 10. The gear teeth in FIG. 2 are herringbone type teeth that provide a stable, low noise, and low vibration gear drive. Other types of gear teeth may be used such as the helical gear teeth shown in FIG. 1, straight or angled gear teeth, or the like.

Referring to FIG. 3, a drive apparatus 50 is illustrated for driving and retracting a drive chain assembly 46. Inactive chain links 10 may be coiled for storage in a magazine (not shown). The drive apparatus 50 includes a housing 52 that defines a channel 54 through which the drive chain assembly is moved. The chain assembly as illustrated includes protrusions 28, or pins, that connect adjacent links 10 to receptacles 22.

A drive shaft 56 rotates a driving gear 58 to move the drive chain 46 fore-and-aft through the channel 54 and 55. The receptacles 22 are guided through the channel 54 and are guided within the channel following the dashed line "D." When the drive chain 46 is driven in the forward direction the drive chain is stacked or pushed together in compression by the driving gear 58 with the driving faces 18 and the central driving face 19 pushing the driven faces 20 and central driven face 21 of the adjacent link 10, respectively. As shown in FIG. 3, the drive chain 46 when moving in the forward direction moves from the horizontally aligned lower portion of FIG. 3, into the channel 54 defined by the housing 52 and vertically upward through the top of the housing 52. The links 10 are guided by internal guides (not shown) through the channels 54 and 55 so that the gear teeth 32 do not touch the channels 54 and 55. The housing 52 may be oriented in other orientations to drive the drive chain in any direction.

The driving gear 58 engages the gear teeth 32 on a side of the drive chain links 10. The gear teeth of course must match the teeth of the drive gear but may be straight teeth, helical teeth of herringbone teeth 32, or other types of tooth configurations. Back-up rollers 60 are provided on the opposite side of the drive chain from the driving gear 58 to facilitate movement of the drive chain 46 through the channel 54 as the driving gear 58 engages the drive chain. The rollers 60 are attached to bushings 62 to reduce friction and increase the durability of the drive apparatus 50.

Figure 4:
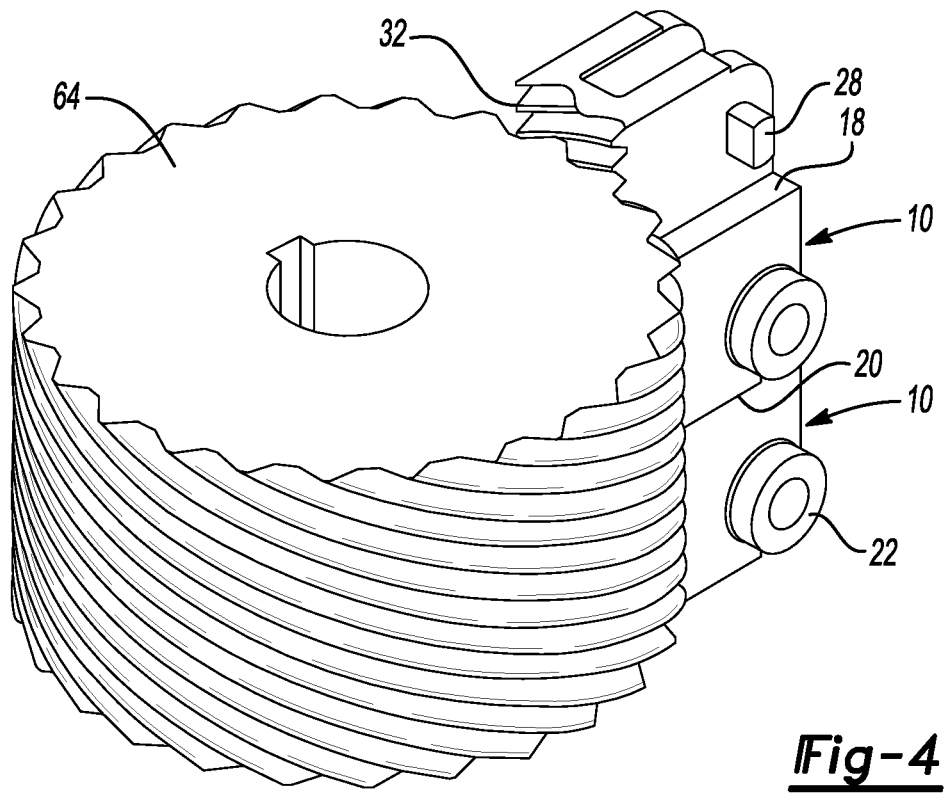
FIG. 4 is a perspective view of an alternative rigid drive chain apparatus made in accordance with another embodiment of this disclosure.

Referring to FIG. 4, an alternative gearing system is illustrated in which a worm gear 64 engages helical gear teeth 32 on a pair of drive chain links 10. Pins 28 are received in receptacles 22 of an adjacent link 10. The worm gear 64 is rotated to move the drive chain 46 in either the forward or rearward direction with the driving face 18 pushing the driven face of the adjacent link 10. The worm gear 64 would be assembled into a housing similar to the housing 50 shown in FIG. 3 that defines a channel 54.

The embodiment of FIGS. 1-4 may be formed in one piece from a durable plastic material or a composite material. Assembly of the chain links 10 does not require additional parts or tools and greatly simplifies manufacturing a drive chain assembly 46.

Figure 5:
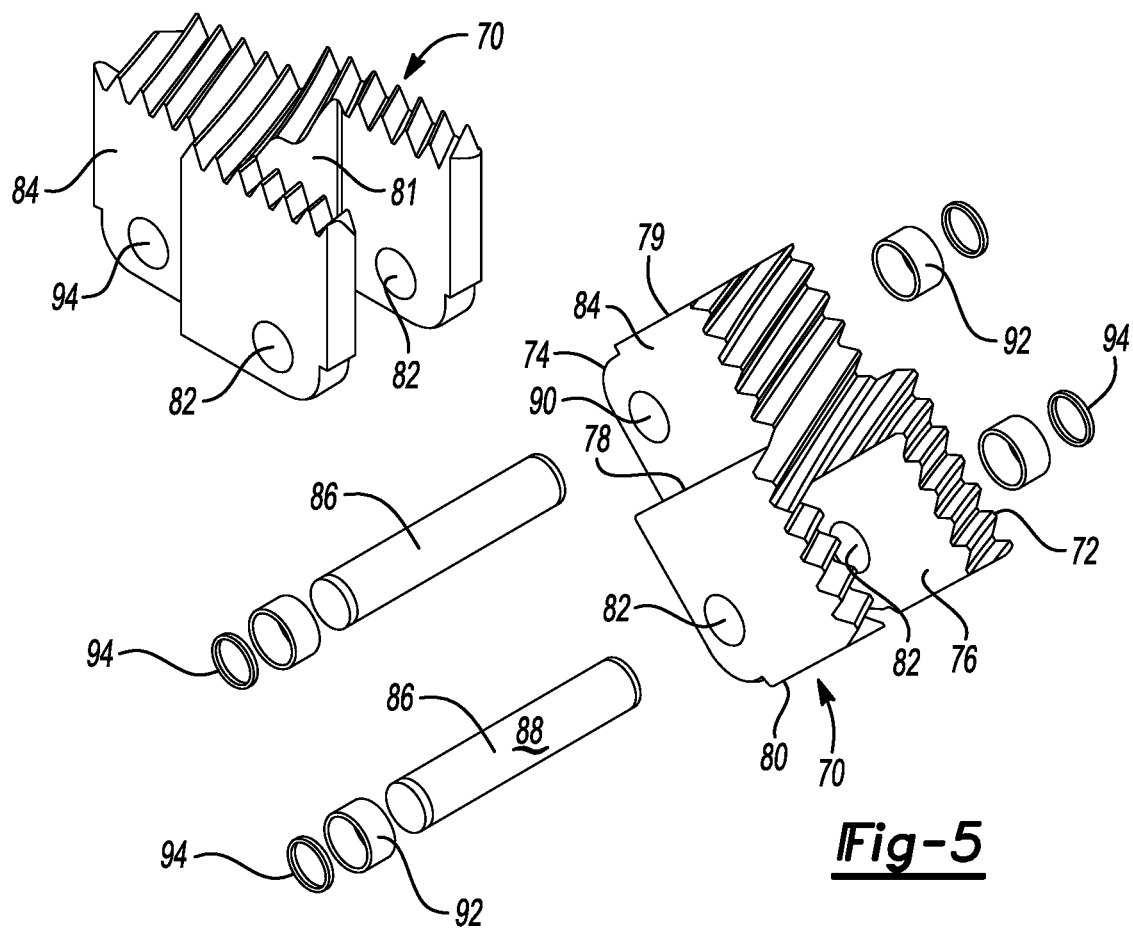
FIG. 5 is an exploded perspective view of two drive chain links and connecting pins with bushings and retainer rings.

Referring to FIG. 5, an alternative embodiment of a drive chain link 70 is illustrated that includes a block end 72 and a connecting end 74. The block end 72 includes a pair of spaced plates portions 76. The plate portions include driving faces 78 and central driving face 79 and driven faces 80 and central driven face 81. When the drive chain links 70 are stacked the driving faces 78 and central driving face 79 pushes the driven faces 80 and central driven face 81 of an adjacent link 70 and supports the supported, or driven faces 80 and central driven face 81.

The block end 72 defines receptacle openings 82 and the connecting end 74 includes a tongue 84. The tongue 84 receives a roller pin 86 that has a cylindrical outer surface 88. The roller pin is received in an opening 90 defined by the tongue 84. A bushing 92 is assembled into the opening 90 to reduce friction and wear caused by driving the chain links 70. Retainer rings 94 are assembled to the roller pins 86 to retain the roller pins 86 in the links 70.

A plurality of gear teeth 96 are provided on a side of the links 70 that span the block end 72 and the connecting end 74.

Figure 6:
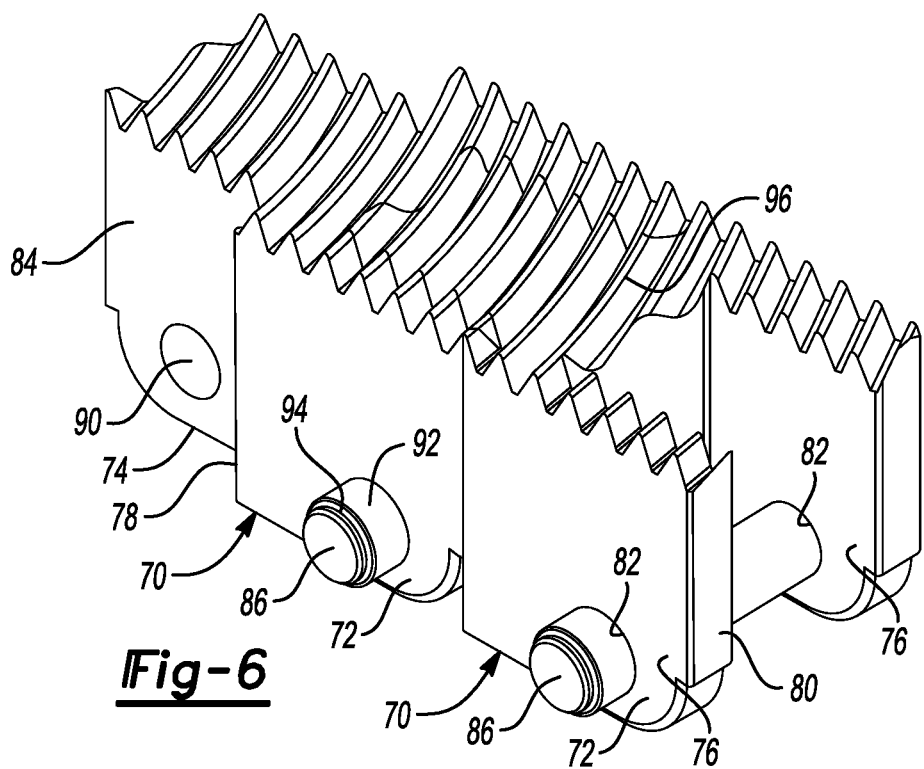
FIG. 6 is a perspective view of a pair of drive chain links assembled together with connecting pins.

Referring to FIG. 6 a pair of drive chain links 70 are shown assembled together with a pair of roller pins 86. The roller pins 86 extend through the receptacle openings 82 in the plate portions 76. Bushings 92 and retainers 94 are used to assemble the roller pins 86 into the receptacle openings. The roller pins 86 also are assembled into the opening 90 in the tongue 84. When assembled, the driving face 78 of one link 70 pushes against the driven face3 80 of the adjacent link 70. Worm gear teeth 96 are provided on a side of the links 70 to facilitate driving the links 70 in either the forward of reverse directions.

Figure 7:
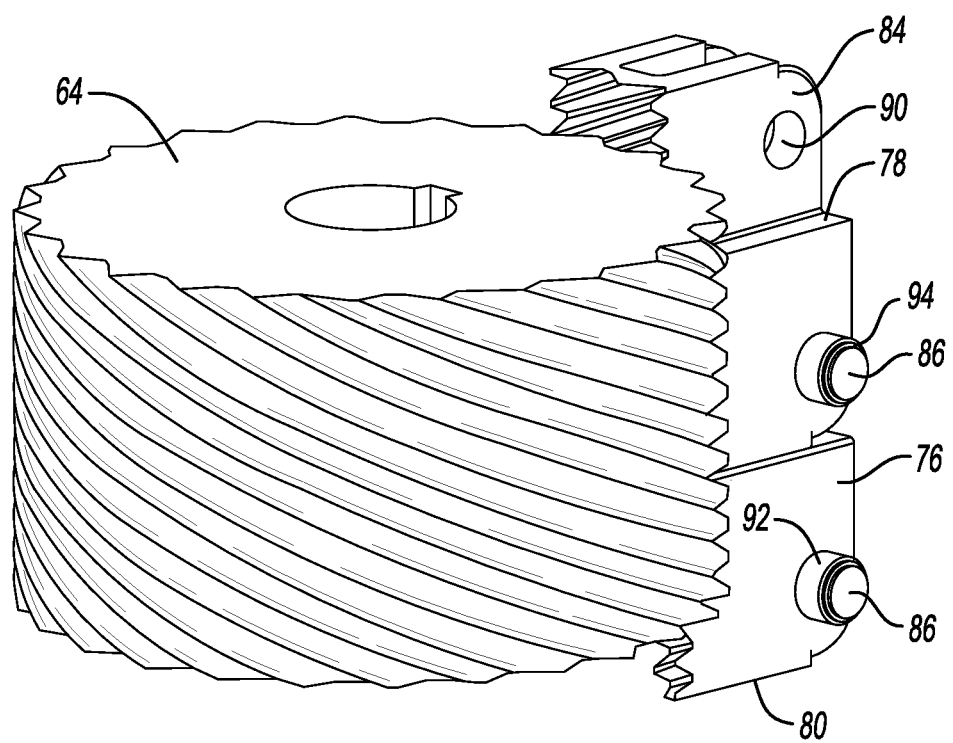
FIG. 7 is a perspective view of a pair of drive chain links being engaged by a worm gear of a drive chain apparatus.

Referring to FIG. 7, a worm gear 64 like that shown in FIG. 4 is illustrated engaging a pair of the alternative links 70. The worm gear 64 is rotated by a drive shaft in a housing defining a channel as previously described with reference to FIG. 3. In the illustrated embodiment, the roller pins 86 are used to connect adjacent links 70 with retainers 92 retaining the roller pins 86 in bushings 92. The roller pins 86 extend through the plate portions 76 and the opening 90 in the tongue 84. The driving face 78 pushes against the driven face 80 when the links 70 are stacked in the forward driving direction.

The embodiment shown in FIGS. 5-7 offers enhanced durability but requires assembly of more parts. The roller pins 86, bushings 92 and retainer rings 94 are expected to be metal parts but could also be fabricated from hard and durable plastics or composites.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A rigid chain comprising:
    a plurality of links connected end-to-end, each link having a block end and a connector end; the block end including a pair of spaced plate portions that define a pair of receptacles, each receptacle including a cavity and a a passageway extending through a respective plate portion of the pair of spaced plate portions from the cavity to an outer surface of the respective plate portion of the pair of spaced plate portions, the block end having pushing faces and pushed faces;
    the connector end including a tongue, wherein the block end and the connector end are monolithic and include a plurality of gear teeth along one side thereof;
    a pair of pins provided on the tongue for connecting the tongue to the pair of receptacles, wherein each of the pins are integrally formed on the tongue, the pair of pins are each connected to a respective one of the pair of receptacles on the block end of said each link of the plurality of links, wherein each of the pair of pins extend from opposite sides of the tongue and through the outer surface of the plate portions, wherein the pins are inserted through the passageways until the pins are fully received in the cavities, and wherein the plurality of links are adapted to be driven by a driving gear between a driving orientation of the links with the pushing faces of said each link engaging the pushed face of an adjacent link in a forward direction and separating the pushing faces of said each link from the pushed face of said adjacent link as the links are driven by the driving gear over a bend in a guide track in a reverse direction; and a bushing provided on the outer surface of each of the plate portions, the bushings each defining an opening aligned with the cavities.

2. The rigid chain of claim 1 wherein each pin is oblong with a width less than a height of the passageway and fits through the passageway, and wherein the pin has a length greater than the height of the passageway.

3. The rigid chain of claim 1 wherein the gear teeth are herringbone gear teeth.

4. A rigid chain drive apparatus comprising:

a plurality of unitary, one-piece links, each link including a block end and a connector end;

the block end including side plates spaced apart to define a slot, each side plate having a pushing face and a pushed face on opposite ends, the side plates each defining a receptacle, wherein each of the receptacles includes cylindrical cavity and a passageway;

the connector end including a tongue extending from the pushing faces of the side plates of the block end and into the slot, wherein the tongue includes a pair of fixed pins that are integrally formed on the tongue and are received in the receptacles, wherein each of the pair of fixed pins extends outwardly from one of the opposite sides of the tongue to an outer side of each one of the side plates, wherein a bushing is provided on the outer side of each one of the side plates, the bushing defining an opening aligned with the cylindrical cavity, wherein the pair of fixed pins are each inserted through the passageway and into the cylindrical cavity, and wherein a plurality of gear teeth is provided on a side of the side plates and the tongue; and a driving gear sequentially engaging adjacent links, the driving gear engaging the gear teeth on the side of the side plates and the tongue to move the links with the pushing faces stacking against the pushed faces in a first direction and unstacking the pushed faces from the pushing faces in a second direction.

5. The rigid chain drive apparatus of claim 4 wherein the driving gear is a pinion gear.

6. The rigid chain drive apparatus of claim 5 wherein the pinion gear includes herringbone teeth and the gear teeth on the side of the side plates and tongue are herringbone teeth.

7. The rigid chain drive apparatus of claim 4 wherein the driving gear is a worm gear having a plurality of helical gear teeth.

8. The rigid chain drive apparatus of claim 4 wherein each of the pins are oblong with a width less than a height of the respective passageways to facilitate sliding the pins through the respective passageways and into the respective cavities, and wherein each of the pins have a length greater than the height of the respective passageways to prevent the pins from being removed from the respective cavities except when the width of the pins is aligned with the respective passageways.

* * * * *